United States Patent
Christensen et al.

(10) Patent No.: US 8,760,118 B2
(45) Date of Patent: *Jun. 24, 2014

(54) SYSTEM AND METHOD FOR CHARGING AND DISCHARGING A LI-ION BATTERY

(75) Inventors: John F. Christensen, Mountain View, CA (US); Jasim Ahmed, Moutnain View, CA (US); Aleksandar Kojic, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 386 days.

This patent is subject to a terminal disclaimer.

(21) Appl. No.: 13/151,612

(22) Filed: Jun. 2, 2011

(65) Prior Publication Data

US 2012/0306275 A1    Dec. 6, 2012

(51) Int. Cl.
*H02J 7/00* (2006.01)

(52) U.S. Cl.
USPC ............................. 320/128; 320/121

(58) Field of Classification Search
USPC .................................. 320/128, 121
See application file for complete search history.

(56) References Cited

U.S. PATENT DOCUMENTS

| | | | |
|---|---|---|---|
| 5,500,583 A | 3/1996 | Buckley et al. | |
| 6,288,521 B1 * | 9/2001 | Meador | 320/118 |
| 7,071,653 B2 * | 7/2006 | Suzuki et al. | 320/128 |
| 7,344,804 B2 | 3/2008 | Klaassen | |
| 7,787,272 B2 * | 8/2010 | Lasseter et al. | 363/98 |
| 2002/0113493 A1 | 8/2002 | Morrow | |
| 2002/0145404 A1 | 10/2002 | Dasgupta et al. | |
| 2003/0071523 A1 | 4/2003 | Silverman | |
| 2007/0015060 A1 | 1/2007 | Klaassen | |
| 2007/0117007 A1 | 5/2007 | Visco et al. | |
| 2007/0212583 A1 | 9/2007 | Johnson | |
| 2007/0224502 A1 | 9/2007 | Affinito et al. | |
| 2007/0259234 A1 | 11/2007 | Chua et al. | |
| 2008/0032236 A1 | 2/2008 | Wallace et al. | |
| 2008/0038641 A1 | 2/2008 | Visco et al. | |
| 2008/0070087 A1 | 3/2008 | Johnson | |
| 2008/0268327 A1 | 10/2008 | Gordon et al. | |
| 2009/0053594 A1 | 2/2009 | Johnson et al. | |
| 2009/0081557 A1 | 3/2009 | Chen et al. | |
| 2009/0239132 A1 | 9/2009 | Johnson | |
| 2009/0291353 A1 | 11/2009 | Affinito et al. | |
| 2009/0317724 A1 | 12/2009 | Kumar et al. | |
| 2009/0325017 A9 | 12/2009 | Johnson | |
| 2010/0086849 A1 | 4/2010 | Mizuno et al. | |
| 2011/0282513 A1 * | 11/2011 | Son et al. | 700/297 |

FOREIGN PATENT DOCUMENTS

WO    2010129825 A1    11/2010

OTHER PUBLICATIONS

MIT Electric Vehicle Team, Dec. 2008 (pp. 1-2 of 3).*
Amatucci et al., "Flouride based electrode materials for advanced energy storage devices," Journal of Flourine Chemistry, 2007, pp. 243-262, Elsevier, North Brunswick, USA (20 pages).

(Continued)

*Primary Examiner* — M'Baye Diao
(74) *Attorney, Agent, or Firm* — Maginot, Moore & Beck (57) ABSTRACT

An electrochemical battery system, in one embodiment, includes a plurality of electrochemical cells, a memory in which command instructions are stored, and a processor configured to execute the command instructions to sequentially connect a first set of the plurality of electrochemical cells to an electrical load, disconnect the first set from the electrical load, connect a second set of the plurality of electrochemical cells to the electrical load, and disconnect the second set from the electrical load, wherein the electrochemical cells in the first set and the electrochemical cells in the second set are selected based upon a target electrochemical cell discharge rate.

20 Claims, 4 Drawing Sheets

(56) References Cited

OTHER PUBLICATIONS

Argonne Website Paper, "Argonne to host next generation battery symposium May 3-4," http://www.eurekalert.org/pub_releases/2010-04/dnl-ath041910.php, published at least as early as May 12, 2010 (10 pages).

Christensen et al., "Effect of Anode Film Resistance on the Charge/Discharge Capacity of a Lithium-Ion Battery," Journal of the Electrochemical Society, 2003, pp. A1416-A1420, vol. 150, No. 11, The Electrochemical Society, Berkeley, USA (5 pages).

Christensen et al., "Cyclable Lithium and Capacity Loss in Li-Ion Cells," Journal of the Electrochemical Society, 2005, pp. A818-A929, vol. 152, No. 4, The Electrochemical Society, Berkeley, USA (12 pages).

Green Car Congress Website Paper, "Argonne National Labs Ramping Up Lithium-Air Research and Development; Li-ion as EV "Bridge Technology"," http://www.greencarcongress.com/2009/12/anl-air-20091221.html, published at least as early as May 12, 2010 (12 pages).

Garlapati, "Development of High Performance Air-Cathodes for Solid State Lithium-Air Cells," Thesis submitted to the School of Engineering of the University of Dayton, May 2010, USA (66 pages).

Hardwick et al., "Beyond Intercalation towards the Lithium-Air Battery," School of Chemistry, University of St. Andrews, United Kingdom (1 pages).

Argonne Website Paper, "Kentucky, Argonne partner to help build domestic battery industry," Argonne National Laboratory, http://www.anl.gov/Media_Center/News/2009/new090408.html, published at least as early as May 17, 2010 (2 pages).

Lu et al, "The Influence of Catalysts on Discharge and Charge Voltages of Rechargeable Li-Oxygen Batteries," Electrochemical and Solid-State Letters, 2010, pp. A69-A72, vol. 13, No. 6, The Electrochemical Society, Cambridge, USA (4 pages).

Younesi et al., "The Effect of Pore Size on the Performance of the Li-O2 Battery," ECS Transactions, 2010, pp. 121-127, vol. 25, No. 35, The Electrochemical Society, Sweden (7 pages).

Zhang et al., "A novel high energy density rechargeable lithium/air battery," Chemical Communications, 2010, pp. 1661-1663, vol. 46, The Royal Society of Chemistry, United Kingdom (3 pages).

Dahn, "Electrically Rechargeable Metal-air Batteries Compared to Advanced Lithium-ion Batteries," Scalable Energy Storage: Beyond Lithium Ion, 2009, IBM Almaden Institute, Almaden, CA (52 pages).

Von Sacken et al., "Comparative thermal stability of carbon intercalation anodes and lithium metal anodes for rechargeable lithium batteries," Journal of Power Sources, 1995, pp. 240-245, vol. 54, No. 2, Elsevier, Canada (6 pages).

Invitation to Pay Additional Fees and, Where Applicable, Protest Fee in corresponding PCT Application (i.e. PCT/US2012/040377), mailed Aug. 23, 2012 (6 pages).

* cited by examiner

SYSTEM AND METHOD FOR CHARGING AND DISCHARGING A LI-ION BATTERY

CROSS REFERENCE TO RELATED APPLICATIONS

Cross-reference is made to U.S. Utility patent application Ser. No. 12/463,092 entitled "System and Method for Charging and Discharging a Li-ion Battery" by Nalin Chaturvedi et al., which was filed on May 8, 2009, now U.S. Pat. No. 8,354,824 which issued on Jan. 15, 2013, the entirety of which is incorporated herein by reference. The principles of the present disclosure may be combined with features disclosed in the above-referenced patent application.

FIELD OF THE INVENTION

The present disclosure relates to batteries and more particularly to lithium-ion batteries.

BACKGROUND

Batteries are a useful source of stored energy that can be incorporated into a number of systems. Rechargeable lithium-ion ("Li-ion") batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (measured in Wh/kg) and energy density (measured in Wh/L) compared to batteries with conventional carbonaceous negative electrodes.

When high-specific-capacity negative electrodes such as lithium are used in a battery, the maximum benefit of the capacity-increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Thus the advantage of using a Li metal negative electrode (sometimes referred to as an anode) is the much higher energy density of the entire cell, as compared to cells with graphitic or other intercalation negative electrode. A disadvantage of using pure Li metal is that lithium is highly reactive. Accordingly, the lithium metal has a propensity to undergo morphology changes, which cause structures having a high surface area to form on and around the negative electrode when the cell is being charged. Exemplary high surface area structures include dendrites and mossy structures. The high surface area structures may in some instances cause an internal short of the cell.

Moreover, asymmetric charging and discharging rates (i.e. where the charge rate is more rapid than the discharge rate) of a Li metal cell results in significant morphology changes. The initially dense lithium metal, after a certain number of cycles, may develop an uneven metal morphology having surface roughness and a sponge-like morphology. Additionally, the high surface area of the uneven metal morphology increases the chance for, and the severity of, runaway reactions within the cell.

What is needed, therefore, is a battery system and charge/discharge method that reduces the potential for dendrite formation and the undesired morphological changes in the anode of battery cells having metal anodes.

SUMMARY

An electrochemical battery system, in one embodiment, includes a plurality of electrochemical cells, a memory in which command instructions are stored, and a processor configured to execute the command instructions to sequentially connect a first set of the plurality of electrochemical cells to an electrical load, disconnect the first set from the electrical load, connect a second set of the plurality of electrochemical cells to the electrical load, and disconnect the second set from the electrical load, wherein the electrochemical cells in the first set and the electrochemical cells in the second set are selected based upon a target electrochemical cell discharge rate.

In accordance with another embodiment, an electrochemical battery system includes a plurality of electrochemical cells, a memory in which command instructions are stored, and a processor configured to execute the command instructions to logically associate the plurality of electrochemical cells into a first set of electrochemical cells and a second set of electrochemical cells, connect the first set of electrochemical cells to an electrical load, disconnect the connected first set of electrochemical cells from the electrical load, connect the second set of electrochemical cells to the electrical load after disconnecting the first set, and disconnect the connected second set from the electrical load, wherein the electrochemical cells in the first set and the electrochemical cells in the second set are logically organized based upon a target electrochemical cell discharge rate.

DESCRIPTION

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 1:
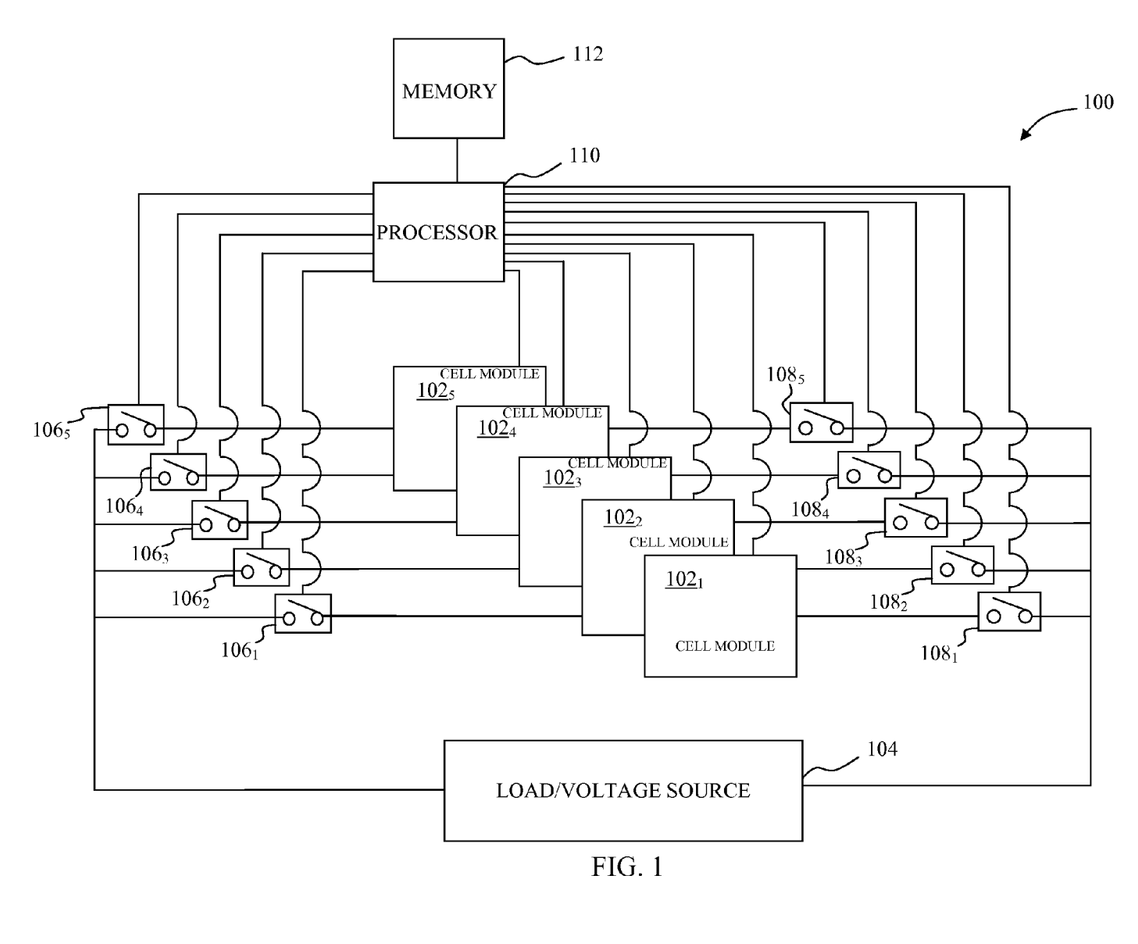
FIG. 1 depicts a simplified schematic of a battery system including several electrochemical cell modules which can be independently controlled for charging or discharging operations.

FIG. 1 depicts a battery system 100 including several battery cell modules $102_x$ having metal negative electrodes. In the embodiment of FIG. 1, five battery cell modules $102_{1-5}$ are depicted each having lithium metal negative electrodes. In alternative embodiments, more or fewer battery cell modules of different or the same chemistry may be provided. Each of the lithium-ion battery cell modules $102_x$ is selectively connected to a load/voltage source 104 or to another one of the battery cell module(s) through one or more of the switches $106_x$ and the switches $108_x$. Each of the switches $106_x$ and the switches $108_x$ are connected to and controlled by a processor 110, which is operably connected to a memory 112. Connections in addition to those shown may be provided in some embodiments.

The processor 110 may configure the switches $106_x$ and the switches $108_x$ to connect one or more battery cell modules $102_x$ to the load/voltage source 104 in any desired arrangement. Accordingly, each battery cell module $102_x$ may be independently charged or discharged. Control of the switches is accomplished using various command instructions, discussed in further detail below, which are saved into the memory 112. The processor 110 is operable to execute the command instructions saved into the memory 112.

The lithium-ion battery cell modules $102_x$ in this embodiment are identical and are described in further detail with reference to FIG. 2 and the lithium-ion battery cell module $102_5$. The lithium-ion battery cell module $102_5$ includes five lithium-ion battery cells $114_{1-5}$. In alternative embodiments, more or fewer battery cells of different or the same chemistry may be provided. A connection switch $116_{1-5}$ is associated with each of the battery cells $114_{1-5}$. Each of the connection switches $116_{1-5}$ is connected to the processor 110 (some connection lines are omitted for clarity of view in the simplified schematic of FIG. 2). Each of the connection switches $116_{1-5}$ is independently controlled by the processor 110, such that the processor may selectively connect a respective one of the battery cells $114_{1-5}$ to an internal battery cell circuit 118, bypass the internal battery cell circuit, or connect the respective battery cell to another one or more of the battery cells. Accordingly, the processor 110 may arrange the battery cells $114_{1-5}$ of the cell module $102_5$ in a number of different arrangements.

Figure 2:
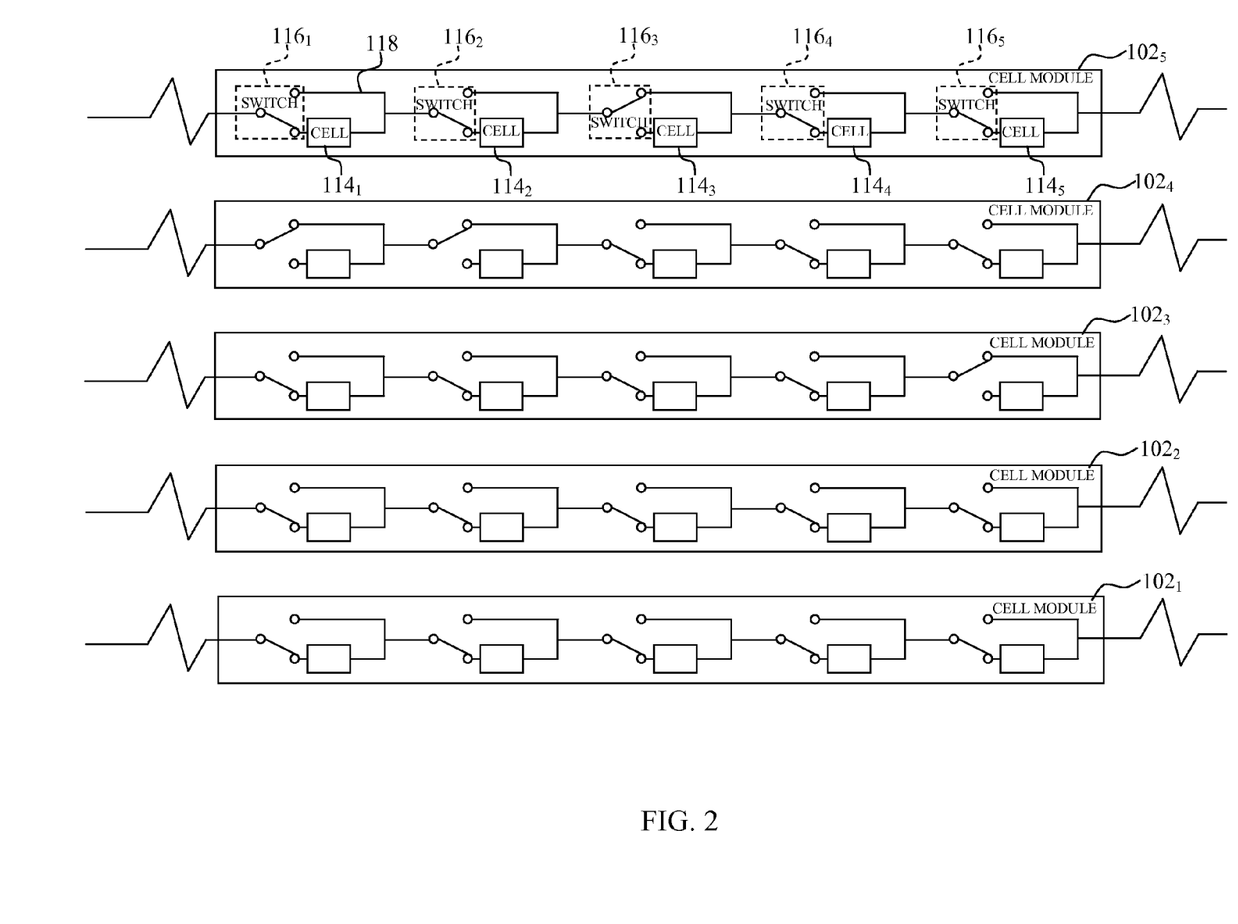
FIG. 2 depicts a simplified schematic of the cell modules of FIG. 1 showing the independently controlled connection switches for each of the electrochemical cells within the electrochemical cell modules.

In the exemplary configuration shown in FIG. 2, the connection switches $116_{1, 2, 4, and 5}$ are positioned to connect the battery cells $114_{1, 2, 4, and 5}$ to the battery cell circuit 118, while the connection switch $116_3$ is positioned to a bypass position, whereby the battery cell $114_3$ is effectively electrically isolated from the battery cell circuit 118. The battery cells $114_{1, 2, 4, and 5}$ are thus connected in a series arrangement.

Figure 3:
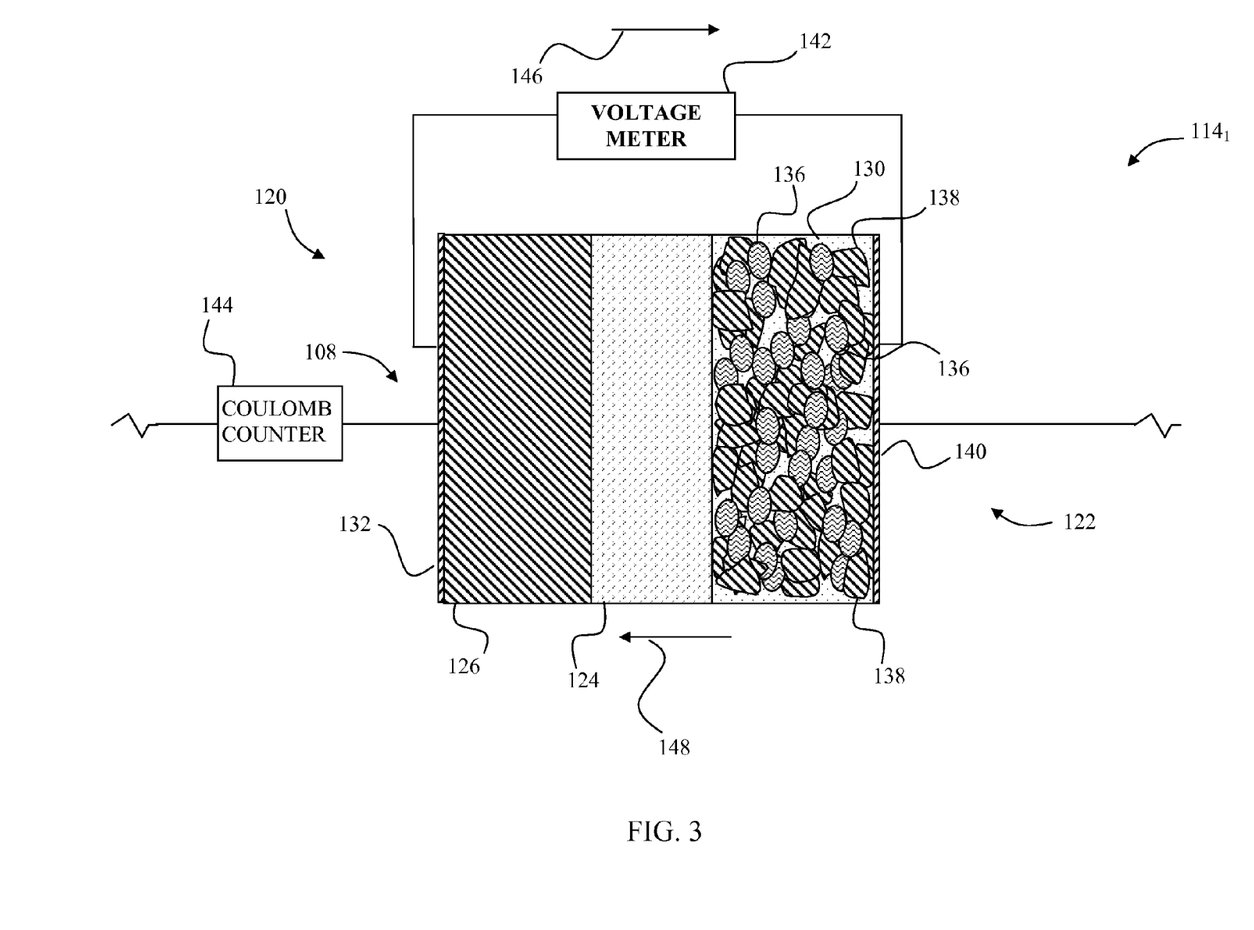
FIG. 3 depicts a schematic of one of the electrochemical cells of FIG. 1 showing a coulomb counter and a voltage meter, which can be used in executing a charging and discharging strategy.

The lithium-ion battery cells $114_{1-5}$ are identical and are described in further detail with reference to the lithium-ion battery cell $114_1$ shown in FIG. 3. The lithium ion cell $114_1$ includes a negative electrode 120, a positive electrode 122, and a separator region 124 between the negative electrode 120 and the positive electrode 122. The negative electrode 120 in this embodiment includes a dense Li foil 126 laminated to the current collector 132.

The negative electrode 120 may be provided in various alternative forms. The negative electrode 120 may incorporate dense Li metal or a conventional porous composite electrode (e.g., graphite particles mixed with binder). Incorporation of Li metal is desired since the Li metal affords a higher specific energy than graphite.

The separator region 124 includes an electrolyte with a lithium cation and serves as a physical and electrical barrier between the negative electrode 120 and the positive electrode 122 so that the electrodes are not electronically connected within the battery cell $114_1$ while allowing transfer of lithium ions between the negative electrode 120 and the positive electrode 122.

The positive electrode 122 includes active material 136 into which lithium can be inserted, inert material 138, the electrolyte 130, and a current collector 140. An optional voltage meter 142 is configured to obtain the voltage between the negative electrode 120 and the positive electrode 122, and an optional coulomb counter 144 is provided to detect current flow into and out of the battery cell $114_1$. If desired, a single coulomb counter 144 may be used to detect current flow into and out of a cell module $102_x$.

The lithium-ion battery cells $114_x$ operate in a manner similar to the lithium-ion battery cell disclosed in U.S. patent application Ser. No. 11/477,404, filed on Jun. 28, 2006. In general, with reference to the battery cell $114_1$, during discharge electrons are generated at the negative electrode 120 and electrons are consumed at the positive electrode 122 as lithium ions and electrons move in the direction of the arrow 146 of FIG. 3. The electrons are generated at the negative electrode 120, because there is extraction via oxidation of lithium ions from the Li metal of the negative electrode 120, and the electrons are consumed at the positive electrode 122, because there is reduction of lithium ions into the active material 136 of the positive electrode 122. During recharging of the cell $114_1$, the reactions are reversed, with lithium ions and electrons moving in the direction of the arrow 148 of FIG. 3.

Returning again to FIG. 1, the electrochemical battery cell modules $102_{1-5}$ may be used to supply electrical power to the load/voltage source 104 during normal discharge operations by selectively controlling the switches $106_{1-5}$ and the switches $108_{1-5}$. Similarly, the electrochemical battery cell modules $102_{1-5}$ may be charged by the load/voltage source 104 during normal charging operations by selectively controlling the switches $106_{1-5}$ and the switches $108_{1-5}$. Charging and discharging of the lithium-ion battery cells $114_x$ within the cell modules $102_x$ connected to the load/voltage source 104 can further be controlled by selectively controlling the connection switches $116_x$.

In practice, users frequently charge and discharge electrochemical battery cells asymmetrically. For example, users commonly desire a battery system 100 that can be charged in minutes (or hours), and that can be discharged over the course of days (or weeks). Such practice, of a fast charge rate and a comparatively slow discharge rate, while convenient to the user or necessitated by operational considerations, increases the potential for dendrite formation, non-uniform morphology changes, and the formation of other high surface area structures (these processes are referred to collectively as morphology changes) in the negative electrode. Morphology changes occur to a greater extent at high rates of charge, because at the high currents associated with high rates of charge, the current distribution becomes less uniform due to the high voltage potential and ion concentration gradients in the electrolyte. These high ion concentration gradients result in preferential deposition of the conductive metal on surfaces closer to the current collector 132 in the negative electrode 120 and thus morphology changes occur.

The battery system 100 is configured to mitigate the above-described morphology changes by implementing a symmetrical charge and discharge profile for the electrochemical battery cells $114_x$ in the cell modules $102_x$. Specifically, the battery system 100 discharges a particular battery cell $114_x$ at a discharge rate that is preferably about equal to or greater than the normal or nominal charge rate of the battery cell to mitigate morphology changes that may have occurred during charging of the battery cell, thereby flattening the metal surfaces of the negative electrode 120. This charge/discharge profile is referred to herein as a "symmetrical charge and discharge profile". Operating a symmetrical charge and discharge profile does not prevent the morphology changes that occur during charging of the battery cells $114_x$; instead, the symmetrical charge and discharge profile results in a discharge rate that reverses (i.e. through a process of electrochemical Li stripping) the morphology changes that may have presented during charging of the battery cell. While a symmetrical charge and discharge profile is achieved at the battery cell $114_x$ level, an overall discharge rate of the battery system 100 can remain much lower than the charge rate of the collection of cells.

Figure 4:
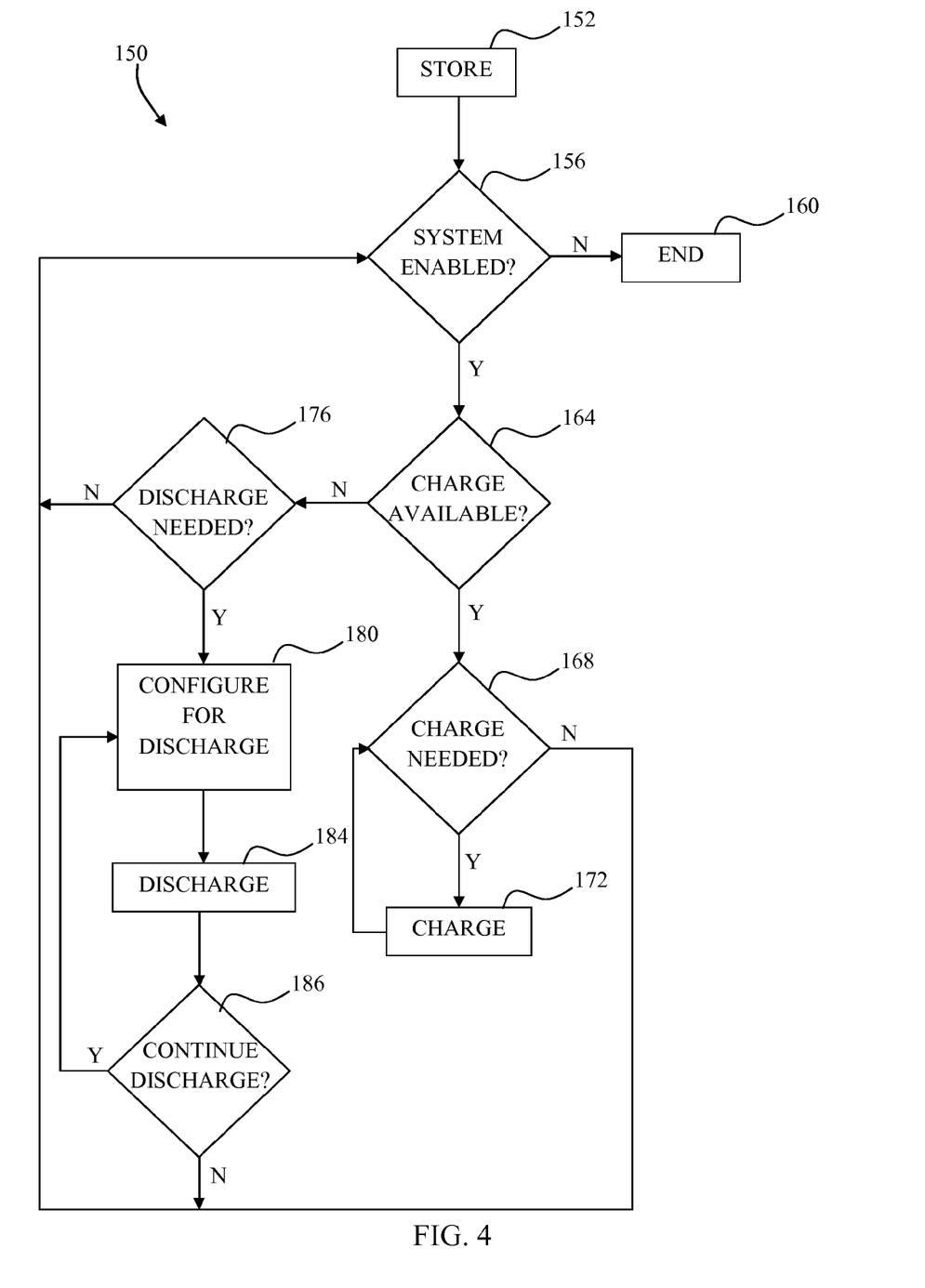
FIG. 4 depicts a flow diagram of an exemplary procedure that may be performed by the battery system of FIG. 1 to control charging and discharging operations of the system of FIG. 1.

The processor 110 in one embodiment operates command instructions stored within the memory 112 in accordance with a procedure 150 depicted in the flowchart of FIG. 4 to symmetrically charge and discharge the electrochemical battery cells $114_x$. Initially, criteria for operating the system 100 are stored in the memory 112, at the block 152. The criteria may be stored in the form of an algorithm with different weights provided for different factors.

Multiple algorithms may be associated with each cell module $102_x$ depending on the arrangement of the cells $114_x$ within the cell module and the desired complexity of the system. By way of example, the criteria may include, among other criteria, a nominal charge voltage ("$V_c$") and a nominal discharge voltage ("$V_d$") for each of the cells $114_x$. Additionally, an initial open cell potential ("OCP")/SOC relationship for each individual cell $114_x$ may be stored in the memory 112. The stored criteria provide values for the algorithm that the processor 110 uses to implement the symmetrical charge and discharge profile. The criteria stored in the memory 112 may be obtained in any desired manner. In some embodiments, the algorithms may comprise a look-up table as described more fully below.

At block 156, the system 100 determines if operation of the system has been enabled such as by checking an on-off switch position. If system operation is not enabled, the process 150 ends at the block 160.

If the system 100 determines that system operation is enabled, the processor next determines if the load/voltage source 100 is functioning as a voltage source at the block 164. The processor 110 may determine if the load/voltage source 100 is a load or voltage source in any desired manner.

If the processor determines that load/voltage source 104 is a voltage source, the processor 110 evaluates the battery cells $114_x$ to determine if the battery cells should receive charge from the voltage source, at the block 168. The processor 110 determines if the battery cells $114_x$ should receive charge in any desired manner. In one exemplary embodiment, the processor 110 accesses the memory 112 to determine a current SOC, actual or estimated, for each of the cells $114_x$. Additionally or alternatively, the processor 110 may receive data from the voltage meters 142 and the coulomb counters 144 associated with each of the cells $114_x$ to determine a present SOC and/or a present OCP of the cells. If no cells are to be charged, then the process 150 continues to block 156.

If at the block 168 any cells are identified as needing a charge, the process 150 continues at block 172 and the processor 110 controls charging of the battery cells $114_x$ with a charging procedure. The specific charging procedure used by the processor 110 may depend on chemical characteristics, physical characteristics, and/or design limitations of the battery system 100. Additionally, the charging procedure may further depend on a desired rate of charge and/or the amount of power available from the load/voltage source 104. The system 100 may use any desired charging procedure to charge the battery cells $114_x$.

In general, the nominal charge current $I_c$ applied to a set of cells connected in series may be expressed by the following relationship:

$$I_c = \frac{P_c}{nV_c}$$

In the foregoing equation, the charge power "$P_c$" is the power available from the load/voltage source 104 to charge a grouped set of cells, such as the battery cells $114_x$, which are connected in series. Assuming each of the cells to be identical, $V_c$ is the voltage drop across each of the cells during charging and "n" is the number of cells that are connected in series. Thus, for a given $P_c$, the $I_c$ can be controlled by controlling the number of cells "n" which are being charged.

Accordingly, in a basic approach for establishing a charge, nominal values for $P_c$, $V_c$, and n may be predetermined to achieve a design $I_c$. The processor 110 in this basic approach may be configured to configure the switches $106_x$, $108_x$, $116_x$ such that the design $I_c$ is applied to each of the cells $114_x$. In some systems this may be accomplished by connecting all of the cells $114_x$ to the load/voltage source 104. In more advanced systems, the number of cells $114_x$ connected to the load/voltage source 104 may be based upon an analysis of the $P_c$ available from the load/voltage source 104. In yet more advanced systems, the $V_c$ of each of the cells $114_x$ may influence the manner in which the set of cells to be charged is determined. The $V_c$ in these more advanced processes may be estimated or determined at some periodicity.

Accordingly, as more information is available regarding the actual state of charge of a particular cell $114_x$, more advanced charging philosophies may be incorporated, resulting in more complex algorithms executed by the processor 110 during a particular charge. In the more complex algorithms, the charging of a particular cell $114_x$ may be prioritized by the processor 110 to achieve desired system parameters. Moreover, the actual charge conditions including the current used to charge each of the cells $114_x$ may be measured and stored in some more complex systems.

Returning to the process 150, after a charge of a selected set of cells has been conducted at block 172, the process 150 returns to block 168 and the processor 110 again determines if a charge is needed. By way of example, the processor 110 may originally select for charging a subset of the cells $114_x$ which are below a first state of charge threshold, wherein the number of cells $114_x$ is limited to establish a target $I_c$. After the initial subset of cells $114_x$ is charged, the state of charge threshold may be modified, such as from cells at 25% state of charge to cells at a 50% state of charge to identify a second subset of cells $114_x$ for charging while achieving a target $I_c$.

When no further cells need to be charged at block 168, the process 150 returns to block 156 and the process 150 continues. Of course, the process 150 may be further modified to terminate charging of the cells $114_x$ based on other criteria besides cell state of charge. Other criteria that may be used by the processor 110 to halt the charge procedure include, but are not limited to, disconnection of the load/voltage source 104 from cell modules 102$_x$, conversion of the load/voltage source 104 from a source to a load, and the processor determining that the cells 114$_x$ have been charged for a desired amount of time.

Returning to block 164, if the processor 110 determines that the load/voltage source 104 is not functioning as a source, then the procedure 150 continues at the block 176 and the processor 110 determines if the load/voltage source 104 is functioning as a load. If the load/voltage source 104 is not functioning as a load, the procedure continues at block 156.

If at the block 176 the load/voltage source 104 is functioning as a load, the processor 110 performs a discharge routine by proceeding to block 180. At block 180, the processor 110 establishes a discharge rate at a cell level which mitigates morphological changes within the cells 114$_x$ which may have presented during charging of the cells 114$_x$ while providing the system discharge rate required by the load/voltage source 104, even if the system discharge rate required by the load/voltage source 104 is much smaller than the nominal charging rate of the cells.

Specifically, the processor 110 in one embodiment controls the number of cells 114$_x$ which are used to supply the load/voltage source 104 so as to substantially achieve a "target discharge rate" for the set of cells which are being discharged at any given moment. The "target discharge rate" as that term is used herein, also referred to as a "target electrochemical cell discharge rate" or "target $I_d$", is a discharge rate that is established based upon the rate at which a cell has been charged or may have been charged.

In general, a target discharge rate is achieved based upon the following simplified system equation:

$$P_d = mV_d I_d$$

This equation is simplified in that it assumes that all of the cells are configured in a series relationship. In practice, while some of the cells are serially arranged, other cells may be arranged differently. Nonetheless, the simplified equation provides a useful basis for explaining the manner in which a target discharge rate may be achieved. In the foregoing equation, the variable "$P_d$" represents the power demand of the load/voltage source 104 and may be determined by any desired method. The number of cells in a series arrangement is represented by "m" while the discharge voltage ($V_d$) represents the nominal voltage of each of the cells 114$_x$ during discharge and "$I_d$" is the discharge current of the cell(s) 114$_x$. As is evident from the foregoing relationship, for a given $P_d$, the $I_d$ may be controlled by controlling the number of cells 114$_x$ included in the series arrangement.

Accordingly, once a target $I_d$ is identified for a particular system, the processor 110 can configure the switches 106$_x$, 108$_x$, and 116$_x$ such that the number of cells 114$_x$ connected to the load/voltage source 104 results in achieving an $I_d$ that is at or about the targeted $I_d$. In scenarios wherein the system discharge rate is much smaller than the system charge rate, the number of cells 114$_x$ selected for discharge at any given moment will be less than the total number of cells 114$_x$ in the system 100. By way of example, the equations discussed above may be rearranged to the following equations:

$$I_d = \frac{P_d}{mV_d}$$

$$I_c = \frac{P_c}{nV_c}$$

By establishing the target $I_d$ to be equal to the $I_c$ of each cell 114$_x$, these two equations are equal and can be rearranged to the following equation:

$$m = n\frac{P_d}{P_c}\frac{V_c}{V_d}$$

In the foregoing equation, the $V_c$ is necessarily greater than the $V_d$, typically resulting in a number less than 1.5 (depending on the chemistry, cell design, and charge/discharge rates involved). Accordingly, the above relationship shows that even when all of the cells 114$_x$ in the system 100 are used in discharge (i.e., m=n), the total power available from the system ($P_{d-total}$) is less than the power used to charge the system ($P_c$). Moreover, as $P_d$ is decreased from $P_{d-total}$ to a lower power, the value of "m" (the number of cells used in discharge) is decreased. Thus, as power demand decreases, the number of cells 114$_x$ needed to provide that power while maintaining a target $I_d$ in the set of cells selected for discharge at any given moment is reduced. By way of example, $P_d$ may be an order of magnitude smaller than $P_c$ for a fast charging system. Thus, a system including 100 cells may use on the order of only 10 cells in any given set of cells selected for discharge.

The foregoing relationships also indicate that since "m" is an integer, the actual $I_d$ will not necessarily be equal to the target $I_d$. In other words, since $P_d$ can vary linearly while $P_c$, $V_c$, $V_d$ and n are substantially fixed, the actual $I_d$ will vary between an upper and lower value for a given number of cells 114$_x$ in a discharge cell set as the $P_d$ varies. When $P_d$ varies sufficiently, the number of cells 114$_x$ in a discharge cell set can be iterated (e.g., from 10 cells to 11 cells) resulting in a step increase or decrease in $I_d$. Accordingly, the target $I_d$ is preferably selected to be less than the maximum allowed $I_d$ of a cell and greater than the $I_c$ of the cell.

The target $I_d$ for a particular embodiment may be determined or established in a number of difference ways. In a basic approach, the target $I_d$ is established based upon a design $I_c$ for the cells in a system. In more complex embodiments, the target $I_d$ may be established based upon actual or estimated $I_c$ for the cells in a system. Moreover, while a single target $I_d$ may be used for an entire system in some embodiments, a unique target $I_d$ may be established for each cell or grouped set of cells in system. The complexity of any particular embodiment can thus vary depending upon the amount of information available for the various cells and the desired complexity for the system. Furthermore, the target $I_d$ may be established at a value that is less than, equal to, or greater than the $I_c$ depending upon the particular embodiment. Preferably, however, the target $I_d$ is established at a value equal to or greater than the $I_c$.

Continuing with the process 150 at block 184, once the target $I_d$ is known, the processor 110 controls the number of the cells 114$_x$ connected to the load/voltage source 104, such that the actual discharge rate of each of the cells approaches, equals, or exceeds the target discharge rate of each of the cells, thereby mitigating the morphological changes. To this end, the processor 110 logically associates the cells 114$_x$ into one or more sets of cells based at least in part upon the target discharge rate. The manner in which the processor 110 logically associates the cells $114_x$ into one or more sets of cells can vary from very basic approaches to very complex approaches.

In one basic approach, processor 110 logically associates the cells $114_k$ into one or more sets of cells based upon a table stored in the memory 112 at block 152. For example, at block 152 a look-up table may be stored in the memory 112. In the table, the cells in the system may be divided into a first group of cell sets that are to be used for a first range of $P_d$. The table may further identify a second group of cell sets that are to be used for a second range of $P_d$. Any number of groups of cell sets for a corresponding number of $P_d$ ranges may be stored.

Thus, at a low range of $P_d$, a large number of discharge cell sets may be identified in the table, each set having a small number of cells $114_x$. As $P_d$ increases to a higher range of $P_d$, the table identifies a smaller number of discharge cell sets, each set having a larger number of cells $114_x$. This embodiment may be implemented with little if any input as to the actual status of the cells $114_x$.

As more information, e.g., estimated or actual data, is available about the condition of the cells $114_x$, more complex approaches may be used in logically associating the cells $114_x$ into one or more sets of cells for discharge. For example, data may be stored in the memory 112 regarding the state of charge, charging history, discharge history, etc., for the cells $114_x$ individually, as a grouped set, or as a system. The processor 110 may use some or all of the stored data to more optimally group the cells $114_x$ into one or more sets for discharge. Thus, in one embodiment the processor 110 may group cells $114_x$ based upon an estimated state of charge for the system 100. In a more complex embodiment, the processor 110 may group cells $114_x$ based upon a state of charge for each individual cell $114_x$ based upon an actual or estimated open cell voltage of the cell $114_x$. The complexity of any particular embodiment can thus vary depending upon the amount of information available for the various cells and the desired complexity for the system.

In any event, once the cells $114_x$ have been logically associated in a desired manner, the processor 110 at block 184 configures the switches $106_x$, $108_x$, and $116_x$ to apply a first set of cells $114_x$ to the load/power source 104. The cells $114_x$ in the first set of cells may include cells from only one of the cell modules $102_x$, or may include cells from more than one of the cell modules $102_x$. Once the first set of cells $114_x$ is applied to the load/power source 104, the first set of cells $114_x$ will exhibit an $I_d$ that approaches, equals, or exceeds the $I_c$ of the cells.

After a first discharge period, which may be established at a predetermined duration and which typically has an order of magnitude of about a millisecond, the processor 110 configures the switches $106_x$, $108_x$, and $116_x$ to remove the first set of cells $114_x$ from the load/power source 104 and the process 150 proceeds to block 186. At block 186, the process 100 determines whether or not additional discharge is needed or available. If power is no longer needed by the load/power source 104 or if the system 100 is no longer capable of providing the needed power to the load/power source 104, the process 150 then continues at block 156.

If at block 186 additional discharge is needed and power is still available in the system 100, the process returns to block 180 and the processor 110 then configures the switches $106_x$, $108_x$, and $116_x$ to apply a second set of cells $114_x$ to the load/power source 104. After a second discharge period, the processor 110 configures the switches $106_x$, $108_x$, and $116_x$ to remove the second set of cells $114_x$ from the load/power source 104 and the process 150 continues at block 186.

As described above, each of the sets of cells $114_x$ is only applied to the load/voltage source 104 for a very brief period of time. Accordingly, the discharge sequence does not result in a state of charge imbalance between the cells $114_x$ in the first applied set of cells and the cells $114_x$ in the other set or sets of cells $114_x$. Moreover, in more complex systems, the discharge period may be varied between sets of cells $114_x$ to maintain a desired state of charge relationship. For example, the first, the second, and the third discharge time periods may each equal one millisecond (1 ms). Alternatively, the first discharge time period may equal 0.5 milliseconds (0.5 ms), the second discharge time period may equal two milliseconds (2 ms), and the third discharge time period may equal three milliseconds (3 ms).

Other modifications to the discharge sequence may also be incorporated into the process 150 depending upon the complexity and operational characteristics desired. For example, in some systems some of the cells $114_x$ may be assigned to more than one set of cells, such that one of the cells is in both a first set of cells and a third set of cells. Also, the number of the cells $114_x$ in a first set of cells may be different than the number of the cells in a second set of cells. Differences in the number of cells in each of the cell sets may be advantageous in systems including detailed information as to the unique condition of each of the cells $114_x$.

Moreover, while operation of the system 100 was described with respect to the process 150, a number of variations to the process 150 in addition to those discussed above may be made within the scope of the present disclosure. For example, the operations described above with respect to blocks 180, 184 and 186 may occur substantially simultaneously such that no substantial fluctuation in $P_d$ is experienced by the load/voltage source 104. Additionally, logical assignment of cells $114_x$ to a particular set of discharge cells may be modified continuously during the discharge procedure.

The battery system 100 can thus be operated in a manner which prolongs the useful life of battery cells with metal negative electrodes (especially Li metal electrodes) by establishing an $I_d$ based upon a targeted $I_d$ which is in turn based upon an $I_c$ of the cells in the system. Accordingly, the battery system 100 enables users to benefit from the high capacity of Li metal battery cells and the convenience of a rapid charge rate. For these reasons and others, the battery system 100 may be especially suitable for powering electrical loads including, but not limited to, portable electronic devices (cell phones, laptop computers, etc.), electric vehicles, and hybrid/electric vehicles.

Advantageously, a target $I_d$ may be used to operate systems of varying complexity. In some embodiments, a target $I_d$ may be identified based upon design parameters and used to generate a look-up table which is stored and accessed by a processor in the system. In other embodiments, a target $I_d$ may be identified by the system itself based upon algorithms which use a variety of data, calculated or measured, related to the cells in the system.

In one embodiment, the processor 110 may also be configured to operate a cell-balancing routine based upon a targeted $I_d$. For example, a first set of the cells $114_x$ is disconnected from the load/voltage source 104 and is connected to a second set of cells. Charge from the first set of the cells is transferred to the second set of the cells such that the first set of the cells are discharged and the second set of the cells is charged. The number and arrangement of the first set of the cells may be controlled such that the discharge rate of the first set of the cells approaches or exceeds the charge rate of the first set of the cells.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. An electrochemical battery system, comprising:
a plurality of electrochemical cells;
a memory in which command instructions are stored; and
a processor configured to execute the command instructions to
sequentially connect a first set of the plurality of electrochemical cells to an electrical load,
disconnect the first set from the electrical load,
connect a second set of the plurality of electrochemical cells to the electrical load, and
disconnect the second set from the electrical load,
wherein the electrochemical cells in the first set and the electrochemical cells in the second set are selected based upon a target electrochemical cell discharge rate.

2. The electrochemical battery system of claim 1, wherein the processor is further configured to execute the command instructions to:
evaluate each of the plurality of electrochemical cells;
connect the first set of electrochemical cells based upon the evaluation; and
connect the second set of electrochemical cells based upon the evaluation.

3. The electrochemical battery system of claim 2, wherein the processor is further configured to execute the command instructions to sequentially:
connect a third set of the plurality of electrochemical cells to the electrical load after disconnecting the second set; and
disconnect the third set from the electrical load.

4. The electrochemical battery system of claim 2, wherein the first set is disconnected from the load about one millisecond after the first set is connected to the load.

5. The electrochemical battery system of claim 2, wherein at least one electrochemical cell of the first set of electrochemical cells is in the second set of electrochemical cells.

6. The electrochemical battery system of claim 2, wherein the number of electrochemical cells in the first set of electrochemical cells is different from the number of electrochemical cells in the second set of electrochemical cells.

7. The electrochemical battery system of claim 2, wherein:
the first set is disconnected from the load after a first duration of time after the first set is connected to the load;
the second set is disconnected from the load after a second duration of time after the second set is connected to the load; and
the first duration of time is different from the second duration of time.

8. The electrochemical battery system of claim 2, wherein the target electrochemical cell discharge rate is established at a current greater than or equal to a nominal electrochemical cell charge current.

9. The electrochemical battery system of claim 8, wherein each of the plurality of electrochemical cells has a respective target electrochemical cell discharge rate, the respective target electrochemical cell discharge rate established based upon an evaluation of the respective electrochemical cell.

10. The electrochemical battery system of claim 1, wherein the processor is further configured to execute the command instructions to:
evaluate each of the plurality of electrochemical cells;
logically associate the first set of electrochemical cells based upon the evaluation; and
logically associate the second set of electrochemical cells based upon the evaluation.

11. The electrochemical battery system of claim 10, wherein the processor is further configured to execute the command instructions to:
connect a third set of the plurality of electrochemical cells to the electrical load after disconnecting the second set; and
disconnect the connected third set from the electrical load.

12. The electrochemical battery system of claim 11, wherein the first set is disconnected from the load about one millisecond after the first set is connected to the load.

13. The electrochemical battery system of claim 12, wherein at least one electrochemical cell of the first set of electrochemical cells is in the second set of electrochemical cells.

14. The electrochemical battery system of claim 10, wherein the number of electrochemical cells in the first set of electrochemical cells is different from the number of electrochemical cells in the second set of electrochemical cells.

15. The electrochemical battery system of claim 10, wherein:
the first set is disconnected from the load after a first duration of time after the first set is connected to the load;
the second set is disconnected from the load after a second duration of time after the second set is connected to the load; and
the first duration of time is different from the second duration of time.

16. The electrochemical battery system of claim 10, wherein the target electrochemical cell discharge rate is established at a current greater than or equal to a nominal electrochemical cell charge current.

17. The electrochemical battery system of claim 16, wherein each of the plurality of electrochemical cells has a respective target electrochemical cell discharge rate, the respective target electrochemical cell discharge rate established based upon an evaluation of the respective electrochemical cell.

18. The electrochemical battery system of claim 1, wherein the electrochemical cells in the first set and the electrochemical cells in the second set are selected such that an actual discharge rate of each of the selected cells exceeds a target discharge rate of each of the selected cells.

19. An electrochemical battery system, comprising:
a plurality of electrochemical cells;
a memory in which command instructions are stored; and
a processor configured to execute the command instructions to
logically associate the plurality of electrochemical cells into a first set of electrochemical cells and a second set of electrochemical cells,
connect the first set of electrochemical cells to an electrical load,
disconnect the connected first set of electrochemical cells from the electrical load,
connect the second set of electrochemical cells to the electrical load after disconnecting the first set, and
disconnect the connected second set from the electrical load,
wherein the electrochemical cells in the first set and the electrochemical cells in the second set are logically associated based upon a target electrochemical cell discharge rate.

20. The electrochemical battery system of claim 19, wherein the electrochemical cells in the first set and the electrochemical cells in the second set are logically associated such that an actual discharge rate of each of the associated cells exceeds a target discharge rate of each of the associated cells.

* * * * *